United States Patent [19]

Voigt

[11] 4,415,298

[45] Nov. 15, 1983

[54] FREIGHT LASHING AND LOCKING MECHANISM

[75] Inventor: Werner Voigt, Weilheim, Fed. Rep. of Germany

[73] Assignee: Messerschmitt-Boelkow-Blohm GmbH, Munich, Fed. Rep. of Germany

[21] Appl. No.: 280,329

[22] Filed: Jul. 6, 1981

Related U.S. Application Data

[63] Continuation-in-part of Ser. No. 125,184, Feb. 27, 1980, abandoned.

[30] Foreign Application Priority Data

Jul. 17, 1980 [DE] Fed. Rep. of Germany ....... 3027160

[51] Int. Cl.[3] ............................. B60P 7/08; B64D 9/00
[52] U.S. Cl. .................................. 410/69; 244/137 R; 410/77
[58] Field of Search .......................... 244/137 R, 118.1; 410/77, 78, 79, 92, 69, 1; 414/518, 21, 536, 529, 531, 532, 533; 198/857

[56] References Cited

U.S. PATENT DOCUMENTS

| | | | |
|---|---|---|---|
| 3,796,397 | 3/1974 | Alberti | 244/137 R |
| 3,810,534 | 5/1974 | Prete, Jr. | 244/137 L |
| 3,927,622 | 12/1975 | Voigt | 244/137 L |
| 3,986,460 | 10/1976 | Voigt | 244/137 R |
| 4,234,278 | 11/1980 | Harshman et al. | 410/69 |
| 4,379,668 | 4/1983 | Pelletier | 410/69 |

Primary Examiner—Galen L. Barefoot
Attorney, Agent, or Firm—W. G. Fasse; D. H. Kane, Jr.

[57] ABSTRACT

The present freight locking mechanism is constructed especially for use on the loading or freight floor of an aircraft. For this purpose all the components are arranged between two flat, horizontally extending frame members in such a position and coordination that all components may be retracted below a level defined by the upper edge of the horizontal frame members. Two freight locking members are effective with their respective claw in opposite directions. The locking members have different width so that they may be arranged next to each other, or one between the legs of the other between the frame members. Each locking member is journalled for a tilting movement and biased by a respective torque spring in such a manner that a release lever (8) may automatically establish a loading or unloading status of the mechanism in response to movement of a freight item over the mechanism in opposite directions.

5 Claims, 4 Drawing Figures

FREIGHT LASHING AND LOCKING MECHANISM

CROSS-REFERENCE TO RELATED APPLICATIONS

The present application is based on German Patent Application No. P 3,027,160.4, filed in the Federal Republic of Germany on July 17, 1980. The priority of said German filing date is claimed for the present application. The present application is also a Continuation-In-Part of my copending application U.S. Ser. No. 125,184, filed Feb. 27, 1980, now abandoned.

BACKGROUND OF THE INVENTION

The present invention relates to a freight lashing and locking mechanism which is especially suitable in the environment described in my copending application U.S. Ser. No. 125,184. Such freight loading system is primarily used for securing freight items such as containers and/or pallets in the loading space of large volume aircraft, wherein such loading space is primarily located below the floor of the aircraft. Such loading systems comprise roller conveyors, ball bearing mats, bearing rollers and braking rollers installed in the loading floor and the associated driving means. The system may be manually operable, however, it is also equipped with electrical and electronic components for a semi-automatic or even for a fully automatic operation. The selection between manual, semi-automatic, or fully automatic operation may be accomplished by the operator by means of a respective control console. In all types of operation the same mechanical locking components are used without any change in their structure or function.

In such a system it is desirable to simplify the mechanical locking components and to construct them in such a manner that penetration into the subfloor of the loading space can be avoided.

OBJECTS OF THE INVENTION

In view of the above it is the aim of the invention to achieve the following objects singly or in combination:

to provide a freight lashing and locking mechanism which has a minimal structural height so that it may be installed on the loading floor without any need for penetration into the loading floor;

to construct a freight lashing and locking mechanism so that all its features may be standardized;

to make sure that upon loading a piece of freight such as a container or pallet, the latter is securely locked in place by the locking members of the mechanism and that upon unloading the locking members of the locking mechanism are cocked into a recessed position without interfering with the unloading; and to provide a locking mechanism for the lashing down of freight items which is suitable for a manual, or a semi-automatic or a fully automatic operation while simultaneously being able to assume a loading or unloading state automatically in response to movement of a freight item.

SUMMARY OF THE INVENTION

According to the invention there is provided a freight lashing and locking mechanism which is particularly suitable for use in a system as described in the above mentioned copending disclosure. The present mechanism comprises a frame forming a housing in which two freight locking members such as locking or lashing claws of different width are operatively journalled on respective journal shafts. Each freight locking member has a respective wedging surface for locking the member into an upright, freight lashing position. Torque spring members are provided for each locking claw to arrest the respective claw in an upright freight lashing position. A release lever is so arranged that it is responsive to a freight item moving in a loading or unloading direction over the mechanism for respectively positioning the freight lashing claws.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
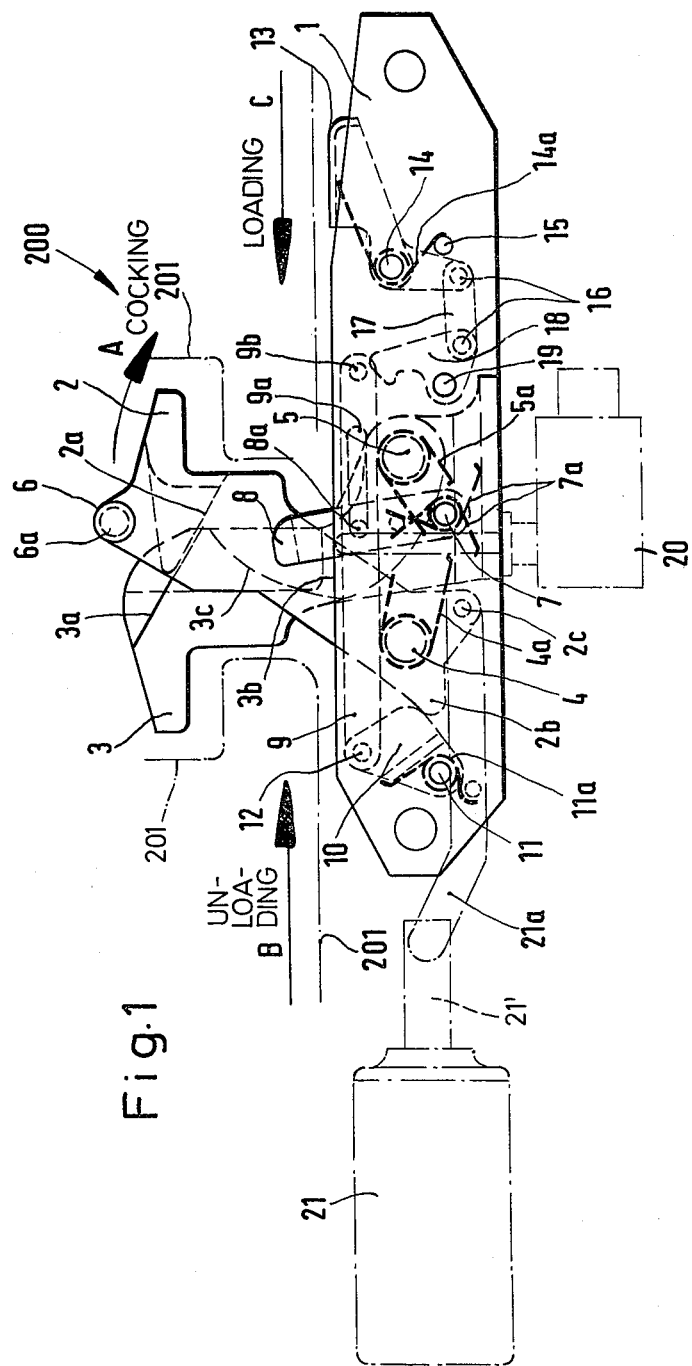
FIG. 1 is a side view of a locking mechanism according to the invention with the freight locking claws in the freight lashing position.
Figure 2:
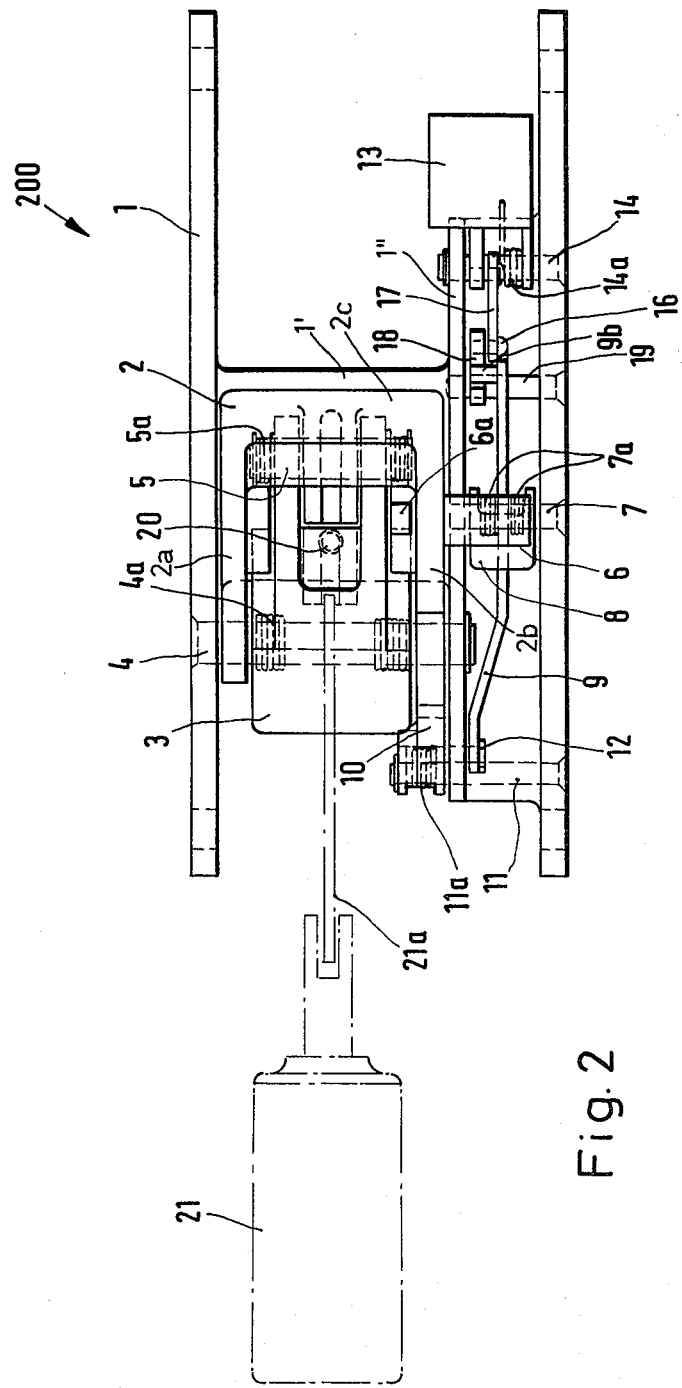
FIG. 2 is a top plan view of the mechanism shown in FIG. 1.

Referring to FIGS. 1 and 2 the present freight lashing mechanism 200 comprises a frame structure including outer side walls 1, a cross brace 1', and an inner bracing member 1". Two lashing claws 2 and 3 are journalled in the frame structure by means of journal shafts or bolts 4, 5 for a tilting movement. Each claw 2, 3 is provided with a wedging or slanted surface 2a, 3a respectively for locking the claws 2, 3 in the upright position shown in FIG. 1 relative to the top edge 3b formed by the lateral frame member 1. Two torque springs 4a and 5a hold the claws 2 and 3 in this upright position. Both claws 2, 3 tilt in the same direction.

A foot lever 6 is operatively secured to the lashing claw 2 on the side thereof whereby the locking claw 2 may be moved in the direction of the arrow A shown in FIG. 1 for cocking the mechanism prior to a loading operation. A cocking release lever 8 is journalled on the shaft 7 and biased by a pair of two torque springs 7a. The release lever 8 is operatively connected to the holding cam 10 by means of a bolt 8a and the push rod 9. The push rod 9 is provided with a longitudinal hole 9a which receives bolt 8a of the release lever 8. Additionally, the push rod 9 is provided with a connecting bolt 9b which cooperates with a hook lever 18 best seen in FIG. 1. The holding cam 10 is journalled on the shaft 11 and pivoted to the release lever 8 through the bolt 12 and through the push rod 9. A torque spring 11a presses the holding cam 10 against a projection 2b of the lashing claw 2. The foot pedal 13 is journalled on a shaft 14 and it is pressed against the stop 15 by means of a spring 14a. The bolts 16 and the connecting link 17 connect the foot pedal 13 to the hook lever 18 which is journalled on the bolt or journal shaft 19 for cooperation with the holding bolt 9b at the right-hand end of the push rod 9 as best seen in FIG. 1. Thus, by stepping on the foot lever 6 the claw 2 may be cocked in the direction of the arrow A into a loading ready position through the elements just described.

For a semi-automatic operation a limit switch 20 shown in dash-dotted lines in FIG. 1 is arranged for cooperation with the present locking mechanism. A fully automatic operation is accomplished by a solenoid 21 having an armature 21' connected to the lashing claw 2 by means of a pull rod 21a which is hooked with its right-hand end to the claw 2 by means of a journal pin 2c. The left-hand end of the push rods 21a is pivoted to the armature 21c. By electrically energizing the solenoid 21 an automatic cocking operation may be accomplished instead of cocking by the operating of the foot lever 6 by the operator. It is an advantage of the present mechanism that the cooperation with the limit switch 20 or with the solenoid 21 does not require any modification of the mechanical structure of the present freight lashing mechanism.

The above described mechanism operates as follows. If the foot lever 6 is depressed, the claw 2 moves downwardly as indicated by the arrow A thereby performing a pivoting movement about the pivot axis or shaft 4 and simultaneously cocking the torque spring 4a. Simultaneously, the relatively weaker biased torque spring 5a moves or pivots the lashing claw 3 about its journal shaft 5 thereby also tilting it also in the direction of the arrow A, whereby the claw 3 is trailing behind the claw 2. During this movement a roller 6a rolls along the detent 3c in the claw 3, please see FIG. 1. The projection 2b of the claw 2 tilts upwardly and presses the holding cam 10, which is supported on the shaft 11, in the rearward direction.

Figure 3:
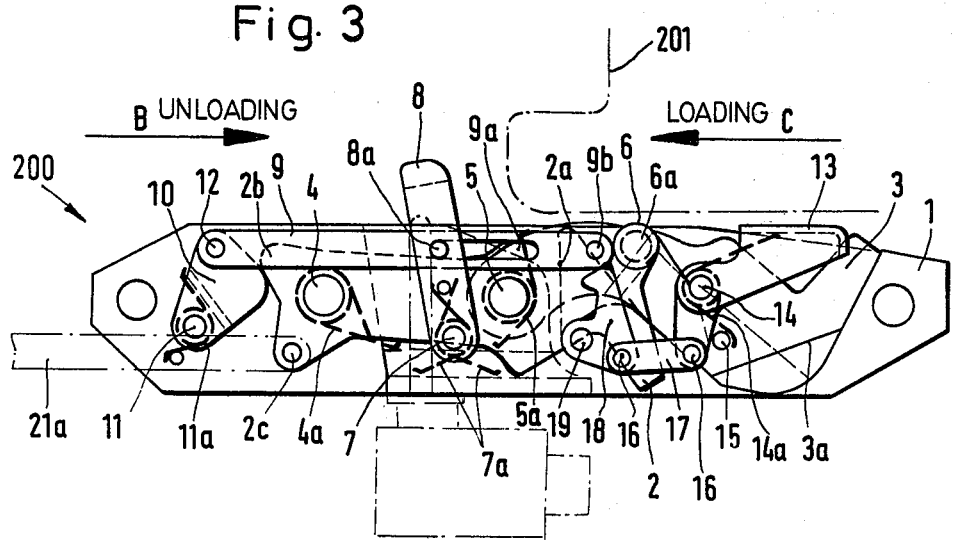
FIG. 3 is a side view of the mechanism in which the lashing claws are recessed in the frame of the mechanism ready for a freight lashing operation.

The push rod 9 is also pulled rearwardly thereby sliding with its longitudinal hole 9a along the bolt 8a of the release lever 8. When the lashing claw 2 reaches its lowered position as shown in FIG. 3, the torque spring 11a will tilt the holding cam 10 about its journal pin 11 and into cooperation with the projection 2b of the lashing claw 2. Thus, the claws are held in a retracted position and any freight items may be removed from the loading space.

When a freight item 201 is unloaded, the freight item moves in the unloading direction of the arrow B thereby moving the release lever 8 in the clockwise direction. Thus, the bolt 8a of the release lever 8 is displaced in the longitudinal hole 9a of the push rod 9 into a position shown in FIG. 4. Thus, the lever 8 is not released as a result of an unloading operation.

During a loading operation the release lever 8 is moved by a freight item 201 in the direction of the arrow C indicating the loading direction, whereby the lever 8 moves counterclockwise. As a result, the bolt 8a of the release lever 8 presses the push rod 9 against the bolt 12 thereby rotating the holding cam 10 about its shaft 11 out of the locking position. The biased torque spring 4a tilts the lashing claw 2 about its journal shaft 4 in an upward direction. During this tilting movement the roller 6a which runs along and in contact with the detent 3c of the lashing claw 3 presses the latter also in an upward direction. The claws 2, 3 are now locked in an upright position by means of the wedging or sliding surfaces 2a, 3a in cooperation with the housing or frame support edge 3b. Thus, a freight item is lashed in position on the loading floor.

For certain loading operations it may be desirable that the lashing claws 2 and 3 are maintained in a lowered down, standby position. For this purpose it is possible to lock the release mechanism by lowering the lever 8, the foot lever 6 has been operated, thereby moving the lever 8 in the direction of the arrow B. In this instance the bolt 8a slides along in the longitudinal hole 9a of the push rod 9 thereby pressing the push rod 9 downwardly until the holding bolts 9b snaps into the hook lever 18. Thus, the release lever 18 cannot be operated by the movement of a freight item 201 and remains in the locked position below the level defined by the upper edges of the lateral frame members 1.

By actuating the foot pedal 13 the just described locked condition may be released because the connecting lever 17 tilts the hook lever 18 about the journal pin 19 thereby releasing the holding bolts 9b. The torque spring 7a tilts the release lever 8 about its journal shaft 7 back into the working position. The two oppositely effective torque springs 7a forming a pair hold the release lever 8 in its working position.

Figure 4:
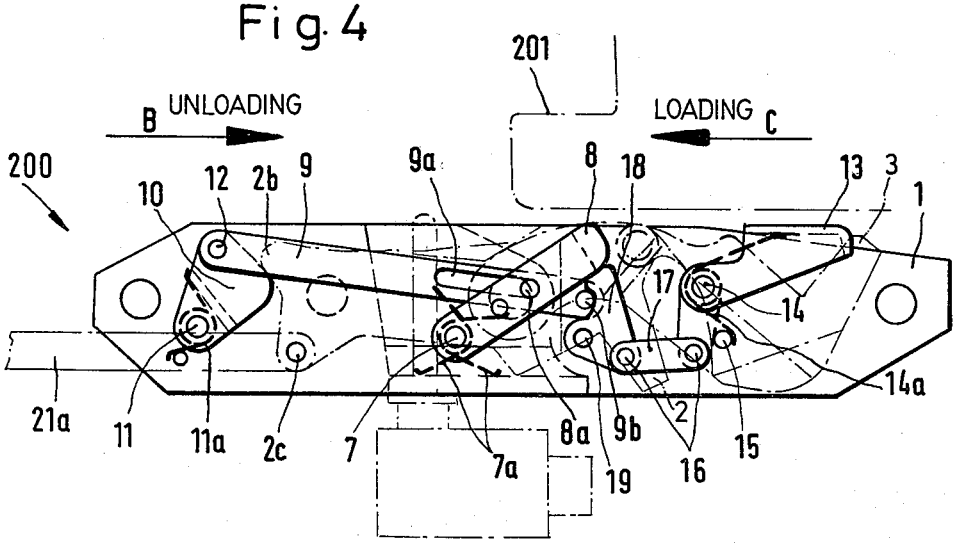
FIG. 4 is a view similar to that of FIG. 3, however, with the release lever depressed by a freight item thereby holding the lashing claws in a standby position.

The freight lashing locking mechanism according to the invention makes it possible to construct the entire mechanism so that it has a minimal total height which is less than two inches when the elements are recessed as shown in FIG. 4. Thus, the present mechanism may be installed on a loading floor without the need for cutting holes into the loading floor.

The present locking mechanism also provides a simplified operation of the entire system because the locking operation is accomplished by the same operating movements for both claws and this in turn is possible because the two claws have different widths and may thus move in the same direction into the recessed position as shown in FIG. 4. For example, the first locking member 2 may comprise two spaced legs 2a, 2b and a yoke 2c connecting the legs substantially at one end thereof while the other free end of the leg is operatively connected to the respective journal pin or shaft 4. The second freight locking member 3 has a width narrower than the spacing between the legs of the first mentioned freight locking member 2 so that the second locking member 3 fits between the legs of the first locking member 2 in a crossover relationship.

As mentioned above, another advantage of the present mechanism is seen in that it may be operated semi-automatically by means of the limit switch 20 or it may be operated fully automatically by means of the solenoid 21.

The disadvantage encountered heretofore that the holes had to be cut into the floor of the loading space, has also been avoided according to the invention.

Although the invention has been described with reference to specific example embodiments it will be appreciated, that it is intended to cover all modifications and equivalents within the scope of the appended claims.

What is claimed is:

1. A freight lashing and locking mechanism, especially for a loading space in an aircraft, comprising two outer frame side walls arranged in parallel to each other and defining a space of given width between said side walls, an inner bracing member (1") extending in parallel to and between said two outer frame side walls for dividing said space into a larger space along one side wall and into a smaller space along the other side wall, crosswise extending means operatively interconnecting said side walls and bracing member to form a frame, operating components including first and second freight lashing claws (2, 3) and respective first and second journal means (4, 5) in said frame tiltably supporting the respective lashing claws (2, 3) in said larger space for tilting substantially in unison in one or the opposite direction, each of said freight locking members having a respective slanting wedging surface (2a, 3a) for cooperation with each other to lock the lashing claws (2, 3) into an upright freight lashing position, first and second torque springs (4a, 5a) operatively installed in said frame for holding the respective freight lashing claw in the freight lashing position, a foot lever (6) and cam means (6a) operatively secured to one of said lashing claws which cooperate for cocking the lashing claws (2, 3) in unison into a recessed position in said larger space prior to a loading operation, cocking release means (8) journalled (at 7) in said frame, first connecting means (8a, 9, 9a, 9b, 10, 12) operatively connecting said cocking release means (8) to said first freight lashing claw (at 2b), said release means (8) extending in a working position above a top edge of an adjacent one of said frame side walls for actuation by a freight item and below the top edge of said adjacent frame side wall in a standby position, a foot pedal (13) journalled (at 14) and biased (at 14a) in said frame, second connecting means (16, 17, 18, 19) operatively connecting said foot pedal (13) to the first connecting means (at 9b) for returning said release means (8) from said standby position into said working position, said foot lever (6), said release means (8), said foot pedal (13) and said first and second, connecting means being operatively mounted in said smaller space substantially alongside said first and second lashing claws (2, 3) for easy access by an operator, whereby all of said operating components are operable manually, semiautomatically and automatically without any structural changes.

2. The mechanism of claim 1, further comprising release locking means (9b, 18) operatively connected to said release lever means (8) for securing said release lever means against unintended release.

3. The mechanism of claim 1 or 2, further comprising a pair of two oppositely effective torque spring members (7a) operatively arranged for cooperation with said release lever means (8).

4. The mechanism of claim 1 or 2, further comprising solenoid means (21) including an armature, a pull rod (21a), and fourth connecting means (2c) for operatively connecting one end of said pull rod to said first freight lashing claw (2) in a removable manner, the other end of said push rod being connected to said armature for performing a fully automatic cocking operation by energizing said solenoid rather than by operation of said foot lever (6).

5. The mechanism of claim 1 or 2, wherein said first lashing claw (2) comprises two spaced legs (2a, 2b) and a yoke (2c) connecting said legs substantially at one end thereof while the other free end of said legs is operatively connected to the respective journal means (4) in said larger space, said second freight lashing claw (3) having a width narrower than the spacing between said legs whereby the second freight lashing claw (3) fits between the legs of the first freight lashing claw (2) in a crossover relationship.

* * * * *